June 3, 1930.                J. E. ESHBAUGH                1,761,910
                                 THERMOSTAT
                             Filed May 19, 1928        3 Sheets-Sheet 2

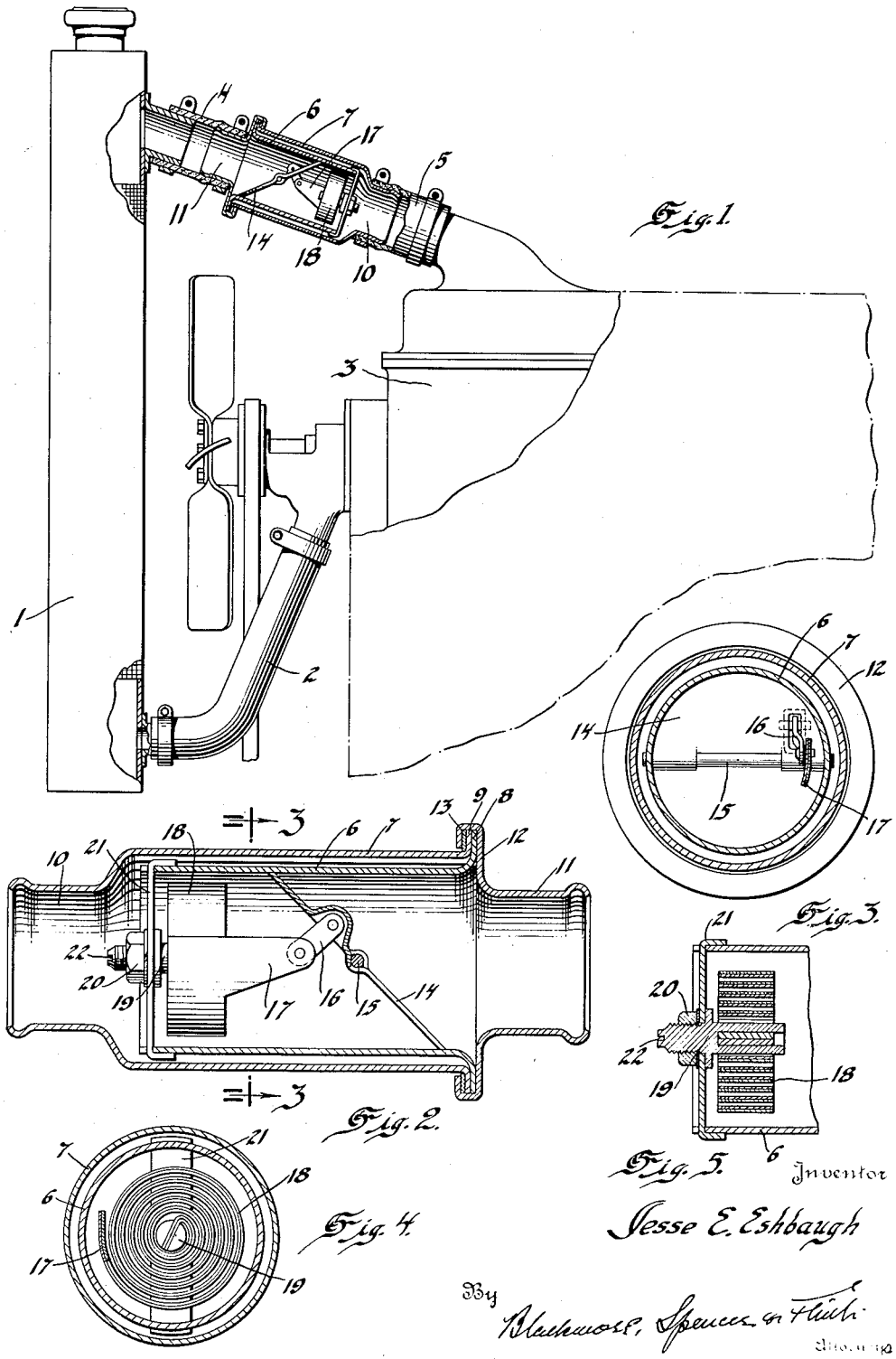

Inventor
Jesse E. Eshbaugh

By Blackmore, Spencer & Hurt
                                                    Attorneys June 3, 1930.  J. E. ESHBAUGH  1,761,910
THERMOSTAT
Filed May 19, 1928   3 Sheets-Sheet 3
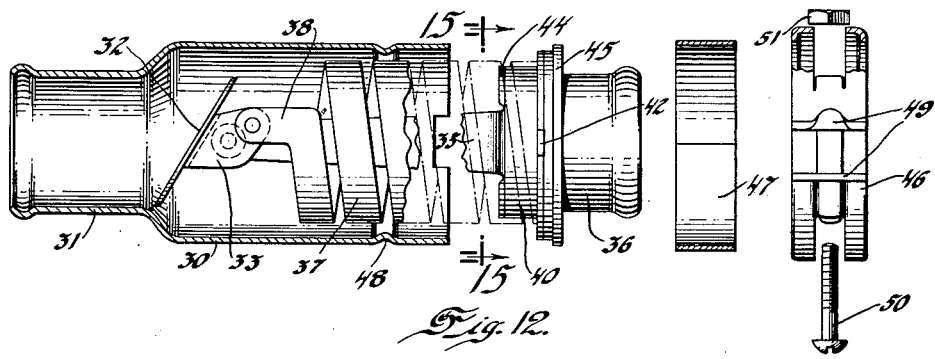
Fig. 12.
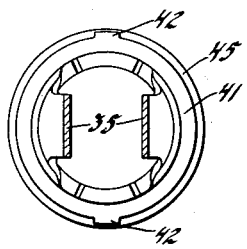
Fig. 15.
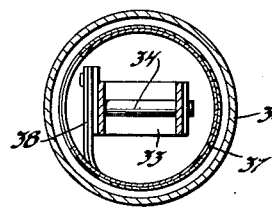
Fig. 14.
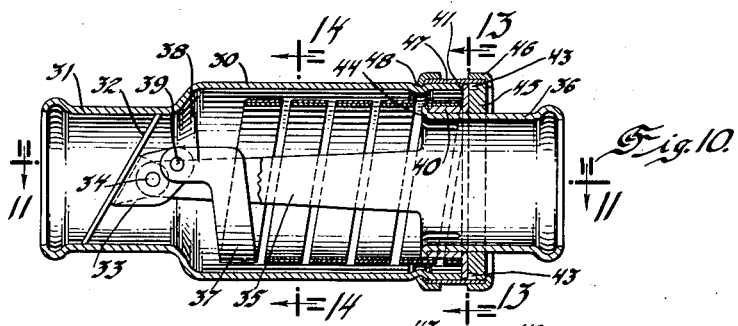
Fig. 13.
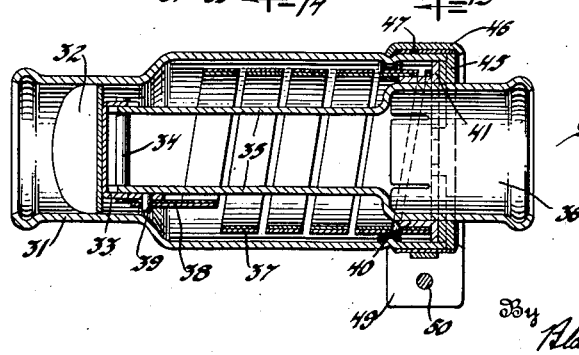
Fig. 10.
Fig. 11.
Inventor
Jesse E. Eshbaugh
By Blackmore, Spencer & Huth
Attorneys Patented June 3, 1930

1,761,910

UNITED STATES PATENT OFFICE

JESSE E. ESHBAUGH, OF FLINT, MICHIGAN, ASSIGNOR TO A C SPARK PLUG COMPANY, OF FLINT, MICHIGAN, A COMPANY OF MICHIGAN

THERMOSTAT

Application filed May 19, 1928. Serial No. 279,148.

This invention relates to automatically operated valves and more particularly to temperature controlled valves for insertion in liquid passageways. The invention is especially adapted, and will be here described, for use in circulatory cooling systems for internal combustion engines, such as employed on motor vehicles, for controlling the temperature of the liquid in the engine water jacket. The device embodying the present subject matter is preferably inserted between the outlet from the engine jacket and the cooling radiator to cut off circulation through the system when the engine is first started and the liquid is cold. As the liquid warms up to a proper temperature for an efficient engine operation, the heat of the liquids acts on a thermo-sensitive element associated with the valve, to open the valve and allow the proper circulation through the system for the dissipation of excess heat and the prevention of engine overheating.

One of the objects of the invention is to provide an improved type of thermostat valve unit which will be simple and compact in construction, economical in manufacture, easy to install, either on existing vehicles or as standard equipment on new cars, automatic in operation, efficient and accurate in use, and unlikely to get out of order.

Another object of the invention is to provide a coiled thermo-sensitive element that may be mounted axially of and directly in the passageway, in order that the liquid flowing therethrough may wash away and prevent the accumulation or deposit of sediment or other foreign material that might otherwise tend to impair its proper operation.

A further object of the invention is to provide an adjustable mounting for the thermo-sensitive element by which the proper action of the valve may be regulated in accordance with the desired temperatures.

The above and other objects and advantages will be apparent from the following specification, taken in connection with the accompanying drawings, in which, Figure 1 is a fragmentary side elevation, partly in section, of an internal combustion engine and a cooling radiator with which the present device is associated.

Figure 2 is a longitudinal sectional view of the thermo-sensitive valve unit.

Figure 3 is a transverse sectional view looking in the direction of the arrows on line 3—3 of Figure 2.

Figure 4 is a transverse section taken on line 3—3 of Figure 2 but looking in the direction opposite to the arrows.

Figure 5 is a detail sectional view of the mounting for the thermostat.

Figure 10 is a longitudinal sectional view of another form of valve unit.

Figure 11 is a section taken on line 11—11 of Figure 10.

Figure 12 is a view partly in section showing the parts ready for assembly.

Figure 13 is a section taken on line 13—13 of Figure 10.

Figure 14 is a section on line 14—14 of Figure 10.

Figure 15 is a section taken on line 15—15 of Figure 12.

Figure 6:
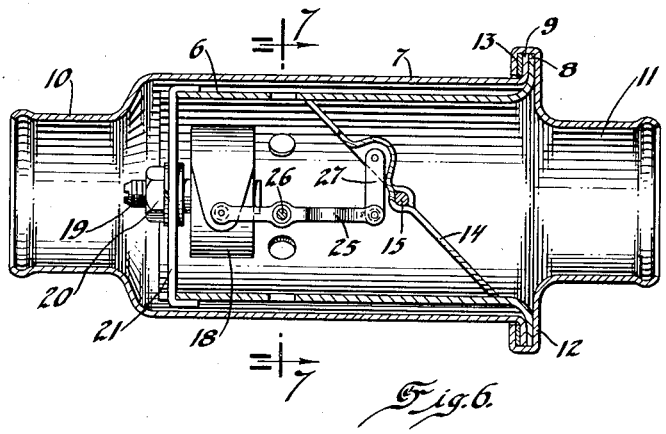
Figure 6 is a longitudinal sectional view of a modified form of thermo-sensitive unit.

Cold water or other suitable cooling medium is supplied from the bottom of the radiator 1 through a suitable hose connection 2 to the water jacket of the internal combustion engine 3, where it takes up the heat of explosions and then returns to the radiator through the device forming the present subject matter, which is inserted between the outlet of the engine jacket and the upper part of the radiator, connected therewith by hose sections 4 and 5. In the device shown in Figure 2 an inner cylindrical casing or cage 6 is concentrically positioned within an outer casing or housing 7, and is provided with an annular flange 8 that abuts a similar flange 9 at one end of the outer casing 7, the opposite end of the outer casing being of reduced diameter to form a neck or extension 10 for the clamping thereon of the hose section 5. The hose section 4 is clamped upon a tubular neck portion 11 that has an annular flange 12 bent or spun over the flanges 8 and 9 and a gasket or washer 13, to fixedly secure the parts together and afford a leak-proof joint. A disk or plate valve 14 is pivotally mounted upon a shaft or pin 15 carried by the inner casing 6, and is connected by a link 16 to a lateral projection or ear 17 integrally formed on the outer end of a spiral or coiled bi-metallic strip or thermo-sensitive element 18, axially mounted in the casing and having its flat surfaces extending in the direction of liquid flow, whereby the current therethrough will wash away sediment and slime and maintain the coil clean. The coiled strip is mounted upon a pin or stud 19 by having its inner end held or clamped within a slotted or bifurcated end of the stud, the opposite end of the stud extending through and being secured by a nut 20 screwthreaded thereon, to a supporting strap 21 located within diametrically opposite notches in the free end of the casing 6, and having its ends turned over into tight engagement with the outside of the casing. Since the inner end of the coiled strip is fixed it will be obvious that the tendency for the thermo-sensitive coil to wind or unwind upon temperature variations, will cause the outer end thereof to move in an arcuate path, thereby swinging the valve about its pivot to closed or opened position. To effect an adjustment of the thermostat so that the valve will open at a predetermined temperature, the nut 20 may be turned back or loosened on the stud, whereupon the stud may be rotated to wind or unwind the coil to the necessary extent. To facilitate adjustment the end of the stud may be grooved or notched as at 22 for the engagement of a suitable tool such as a screwdriver.

Figure 7:
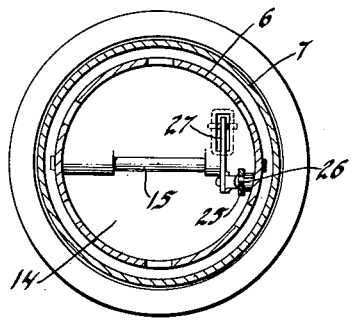
Figure 7 is a transverse section on line 7—7 of Figure 6 looking in the direction of the arrows.
Figure 8:
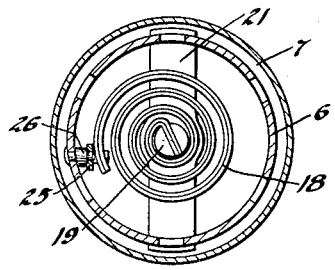
Figure 8 is a transverse section on line 7—7 of Figure 6 looking in the direction opposite to the arrows.
Figure 9:
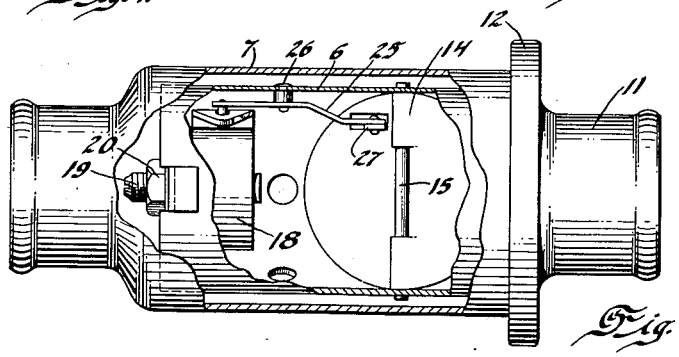
Figure 9 is a bottom plan view of the device shown in Figure 6 with parts broken away.

In lieu of forming the integral ear on the outer end of the coiled thermo-sensitive strip, the arrangement shown in Figures 6 to 9 may be employed wherein a lever 25 is pivoted upon a pin or stud 26 fixed to the wall of the inner casing, one end of the lever being pivoted to the outer end of the coil and the other end being connected by link 27 with the valve.

The modified construction illustrated in Figures 10 to 15 embodies a helical bi-metallic element of a diameter larger than the outlet passageway, whereby resistance to the current flowing axially therethrough is reduced to a minimum. In this case the housing or casing 30 has a reduced neck or extension 31, in which is located a plate valve 32, carried by a bracket 33, that is pivoted upon a pin or shaft 34 on the ends of a pair of projections or fingers 35 of a tubular portion 36. One end of the helical flat strip 37 is provided with a lateral projection or ear 38, pivotally connected by a pin 39 to the bracket 33, while the other end is fixedly secured upon a collar or sleeve 40 mounted upon the tubular portion 36. The sleeve 40 which has an annular flange 41 with a pair of projections 42 extending into notches 43 in tubular portion 36 and a collar 45 that abuts the end of the casing 30. The parts are held in assembled relation by a clamp collar 46 surrounding a split band 47 and having marginal inturned flanges at both sides, one of which extends into an annular groove or depression 48 in the casing 30 and the other of which overhangs the end of the casing and collar 45, the clamp collar also having its end out-turned to form lateral projections or ears 49, which may be drawn together to contract the collar by adjustment of the screw 50 extending through the ears and engaging with the nut 51. Thus the assembly of the device can be readily and quickly accomplished. Adjustment to effect proper operation of the valve or its swinging movement to opened and closed positions at predetermined temperatures, may be easily made by turning the sleeve 40 relative to the tubular portion 36, within the limits afforded to the ears 42 by the notches 43, when the clamp collar is loose, to thereby wind or unwind the coiled thermo-sensitive strip 37.

While the invention has been described more or less specifically it is to be understood that various modifications may be made, such as come within the scope of the appended claims.

I claim:

1. In a device of the character described, a tubular member having opposite notches in one end, a swinging plate valve pivoted at an intermediate point in said member, a U shaped strap extending across the end of said member and positioned within the notches with its legs in frictional contact with the outer surface of the member, and a coiled thermo-sensitive element mounted on said strap axially of the member and having an operative connection with said swinging plate valve.

2. An automatic valve unit for interposition in a fluid passageway including an outer casing having opposite ends adapted for attachment with portions of a fluid passageway, an inner casing opened at both ends concentrically positioned in the outer casing and secured thereto at one end a transverse shaft secured at opposite ends to the inner casing wall at substantially diametrically opposite points and intermediate the ends of the inner casing a butterfly valve pivoted for swinging movement on said shaft, a coiled thermo-sensitive element mounted at the free end of and within the inner casing and an operative connection between the coiled element and the valve.

3. An automatic valve unit for interposition in a fluid passageway including an outer casing having opposite ends adapted for attachment with portions of a fluid passageway, an inner casing having its opposite ends open and concentrically positioned in and secured at one end to the outer casing, a swinging plate valve pivotally mounted in and at a point intermediate the ends of the inner casing, a strap extending across the free end of the inner casing with its opposite ends turned into contact with and frictionally engaging the outer surface of the casing, and a thermo-sensitive element carried by said strap and operatively connected with the swinging plate valve.

4. An automatic valve unit for interposition in a fluid passageway including an outer casing having opposite ends adapted for attachment with portions of a fluid passageway, an inner casing having its opposite ends open and concentrically partitioned in and secured at one end to the outer casing, a swinging plate valve pivotally mounted in and at a point intermediate the ends of the inner casing, a U shaped strap extending across the free end of the inner casing and into a pair of oppositely disposed notches with its legs in frictional engagement with the outer surface of the casing, a coiled thermo-sensitive element carried by said strap with its coils in a plane axially of the casing, and operatively connected with said swinging plate valve.

5. A device wherein a spirally coiled thermo-sensitive element is axially positioned within a casing with its outer end operatively connected with a swinging plate valve pivoted in the casing, characterized by a strap extending transversely of the casing, a stud having a screw threaded end projecting thru the strap with an intermediate shoulder abutting the strap and with a slot in its opposite end into which slot is introduced the inner end of the spirally coiled thermo-sensitive element, whereby rotation of the stud will wind or unwind the coil to control the automatic actuation of the valve at a predetermined temperature, and a nut threaded on the stud with the strap clamped between the nut and abutment shoulder to lock the stud against rotation after adjustment of the coil is effected.

6. Means to adjustably mount a spirally coiled thermo-sensitive element axially in a casing and whose outer end is operatively connected with a swinging plate valve pivoted in the casing, whereby the automatic actuation of the valve may be governed according to predetermined temperature, including a strap extending across the casing, a stud having one end screw threaded and extending thru an opening in the strap with an intermediate abutment for contact with the strap and having its opposite end bifurcated between the furcations of which the inner end of the coiled thermo-sensitive element is clamped, whereby the coiling of the strip may be varied by rotation of the stud, and a fastening nut threaded on the stud with the strap between the nut and abutment to hold the stud against rotation.

In testimony whereof I affix my signature.

JESSE E. ESHBAUGH.